US011709060B2

(12) United States Patent
Okazaki et al.

(10) Patent No.: US 11,709,060 B2
(45) Date of Patent: Jul. 25, 2023

(54) VEHICLE OPERATION MANAGEMENT DEVICE, OPERATION MANAGEMENT METHOD, AND TRANSPORTATION SYSTEM

(71) Applicants: TOYOTA JIDOSHA KABUSHIKI KAISHA, Toyota (JP); DENSO CORPORATION, Kariya (JP)

(72) Inventors: Kenji Okazaki, Toyota (JP); Hiroshi Higashide, Toyota (JP); Keiichi Uno, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 104 days.

(21) Appl. No.: 17/215,480

(22) Filed: Mar. 29, 2021

(65) Prior Publication Data
US 2021/0310816 A1 Oct. 7, 2021

(30) Foreign Application Priority Data
Apr. 2, 2020 (JP) .................................. 2020-066600

(51) Int. Cl.
*G01C 21/34* (2006.01)
(52) U.S. Cl.
CPC ................. *G01C 21/3415* (2013.01)
(58) Field of Classification Search
CPC .............. G01C 21/3415; G05D 1/0291; B60W 60/001
USPC .............................................. 701/422
See application file for complete search history.

(56) References Cited

U.S. PATENT DOCUMENTS

| 5,928,294 A | * | 7/1999 | Zelinkovsky | ........ | G05D 1/0265 |
| | | | | | 318/587 |
| 10,458,801 B2 | * | 10/2019 | Lord | ........ | G01C 21/34 |
| 2012/0290182 A1 | * | 11/2012 | Cooper | ........ | B61L 27/16 |
| | | | | | 701/70 |

(Continued)

FOREIGN PATENT DOCUMENTS

| CN | 104575059 A | | 4/2015 | | |
| EP | 2733560 A1 | * | 5/2014 | ........ | G05D 1/0011 |

(Continued)

OTHER PUBLICATIONS

Jiwon et al., "The Research of Multi-Layer-Based on Path Planning for Generating Optimal Path," 2016, Publisher: IEEE.*

(Continued)

*Primary Examiner* — Tuan C To
(74) *Attorney, Agent, or Firm* — Oliff PLC

(57) ABSTRACT

An operation management device includes a plan generating section for generating a travel plan, for each of a plurality of vehicles traveling autonomously along a prescribed travel route on which are provided a plurality of stations, including at least departure timing at the stations, a communication device for transmitting to corresponding vehicles the travel plan generated by the plan generating section, and an operation monitoring section for obtaining a delay amount of the vehicles relative to the travel plan, wherein the plan generating section judges whether or not revision of the travel plan is necessary based on the delay amount obtained by the operation monitoring section, and revises and regenerates the travel plan if the revision is necessary.

10 Claims, 16 Drawing Sheets

(56) References Cited

U.S. PATENT DOCUMENTS

| | | | |
|---|---|---|---|
| 2013/0144467 A1* | 6/2013 | Kickbusch | G06Q 50/30 701/2 |
| 2014/0136025 A1* | 5/2014 | Cooper | B61L 3/006 701/2 |
| 2018/0063261 A1* | 3/2018 | Moghe | G08G 1/123 |
| 2018/0172458 A1* | 6/2018 | Yamamoto | G01C 21/3438 |
| 2019/0156672 A1* | 5/2019 | Konishi | G06Q 10/047 |
| 2019/0193764 A1* | 6/2019 | Cooper | B61L 17/00 |
| 2019/0286151 A1* | 9/2019 | Palanisamy | G08G 1/096816 |
| 2020/0172036 A1* | 6/2020 | Sakai | B60W 50/0225 |
| 2020/0173795 A1* | 6/2020 | Hardee | G01C 21/3415 |
| 2021/0016805 A1* | 1/2021 | Oba | G06T 3/00 |
| 2021/0262811 A1* | 8/2021 | Zellner | G01C 21/3492 |
| 2022/0032948 A1* | 2/2022 | Kudo | B60W 30/18159 |

FOREIGN PATENT DOCUMENTS

| | | | | |
|---|---|---|---|---|
| EP | 3151174 A1 | * | 4/2017 | |
| JP | 2000-264210 A | | 9/2000 | |
| JP | 2002-205648 A | | 7/2002 | |
| JP | 2014-210530 A | | 11/2014 | |
| WO | WO-2013140401 A2 | * | 9/2013 | G05D 1/0088 |

OTHER PUBLICATIONS

Seyed et al., "Mixed-Integer Linear Programming for Optimal Scheduling of Autonomous Vehicle Intersection Crossing," 2018, vol. 3, Publisher: IEEE.*

Bangjun et al., "Real Time Trajectory Re-planning for Autonomous Vehicle Lane Changing in Uncertain Traffic," 2019, Publisher: IEEE.*

* cited by examiner

|   | a | b | c | d | a | b |
|---|---|---|---|---|---|---|
| A | 7:00 ⑤ | 7:05 | 7:10 | 7:15 | 7:20 | 7:25 |
| B | ⑤ 6:55 | 7:00 | 7:05 | 7:10 | 7:15 | 7:20 |
| C | 6:50 | 6:55 | 7:00 | 7:05 | 7:10 | 7:15 |
| D | 6:45 | 6:50 | 6:55 | 7:00 | 7:05 | 7:10 |

FIG. 4

VEHICLE OPERATION MANAGEMENT DEVICE, OPERATION MANAGEMENT METHOD, AND TRANSPORTATION SYSTEM

CROSS REFERENCE TO RELATED APPLICATION

This application claims priority to Japanese Patent Application No. 2020-066600 filed on Apr. 2, 2020, which is incorporated herein by reference in its entirety including the specification, claims, drawings, and abstract.

TECHNICAL FIELD

The present specification discloses an operation management device that manages operation of a plurality of vehicles traveling autonomously along a prescribed travel route on which are provided a plurality of stations, an operation management method, and a transportation system having the operation management device.

BACKGROUND

In recent years, transportation systems using vehicles capable of autonomous driving have been proposed. For example, Patent Document 1 discloses a vehicular transportation system using vehicles that can travel autonomously along a dedicated route. This vehicular transportation system has a plurality of vehicles traveling along a dedicated route and a control system operating the plurality of vehicles. The control system sends departure commands and course commands to the vehicles according to an operation plan. In addition, the control system increases or decreases the number of vehicles according to transportation demand.

CITATION LIST

Patent Literature

Patent Document
JP 2000-264210 A

However, Patent Document 1 does not sufficiently consider measures to be taken if each vehicle is delayed with respect to its operation timetable (namely, travel plan). Therefore, if a delay occurs, the art of Patent Document 1 fails to take appropriate measures, and the delay may continue for a long time, and in some cases, there is a risk the delay may worsen. In this case, the wait time for vehicles at stations and the travel time between stations would increase, thereby decreasing the convenience of the transportation system.

Therefore, the present specification discloses an operation management device, an operation management method, and a transportation system that can further improve the convenience of the transportation system.

SUMMARY

An operation management device disclosed in the present specification includes a plan generating section for generating a travel plan, for each of a plurality of vehicles traveling autonomously along a prescribed travel route on which are provided a plurality of stations, including at least departure timing at the stations; a communication device for transmitting to corresponding vehicles the travel plan generated by the plan generating section; and an operation monitoring section for obtaining a delay amount of the vehicles relative to the travel plan; wherein the plan generation section judges whether or not revision of the travel plan is necessary based on the delay amount obtained by the operation monitoring section, and revises the travel plan if the revision is necessary.

As appropriate, since whether or not revision of the travel plan is necessary and the travel plan is revised, a continuation or increase of the delay of vehicles can be effectively prevented. As a result, an increase of wait times of vehicles at stations and travel times between stations can be reduced, thereby further improving the convenience of the transportation system.

In this case, the operation monitoring section may obtain a delay time of the vehicles relative to the travel plan, the plan generating section may calculate, based on at least the delay time, as an allowable dwell time a maximum dwell time capable of preventing increased delay, compare the allowable dwell time with a dwell time distribution, which is a probability distribution of dwell time at the stations, and calculate as a delay increase probability a probability of the dwell time being greater than or equal to the allowable dwell time, and judge revision of the travel plan is necessary if the delay increase probability is greater than or equal to a prescribed reference increase rate.

With this configuration, since revision of the travel plan is judged to be necessary if the delay increase rate is high, the frequency of revision of the travel plan can be reduced and the increase of delay can be reduced.

In this case, the plan generating section may revise the dwell time distribution based on at least one of the following: date and time, delay status, reservation status, passenger information pertaining to passengers transmitted from the vehicles, and waiting user information pertaining to users waiting at the stations sent from a station terminal provided in the stations.

Revising the dwell time distribution can improve the accuracy of the delay increase probability. As a result, the travel plan can be revised with more suitable timing.

In this case, the passenger information and waiting user information include the numbers and attributes of the passengers and waiting users, and the attributes may include at least one of the following: use or nonuse of a wheelchair, use or nonuse of a white cane, use or nonuse of a stroller, use or nonuse of an orthotic device, or an age group.

With this configuration, the accuracy of the delay increase probability is further improved and the travel plan can be revised with more suitable timing.

Furthermore, the plan generating section may calculate, based on the waiting user information, an amount of increase of waiting users per unit of time at the station and revise the dwell time distribution based on the amount of increase.

With this configuration, the accuracy of the delay increase probability can be improved and the travel plan can be revised with more suitable timing.

Furthermore, the plan generating section may judge whether or not revision of the travel plan is necessary based on a change in time of the delay amount.

With this configuration, since revision of the travel plan is judged to be necessary based a change in time of the delay amount, as well as a trend of recovering from delay, the frequency of revision of the travel plan can be reduced and the increase of delay can be reduced.

In this case, the plan generation section may judge revision of the travel plan is necessary if a delay amount difference, which is a value obtained by subtracting the most recent delay amount from the delay amount from a past predetermined comparison period, is less than or equal to a prescribed differential reference.

If the delay amount difference is small, namely, if the delay amount hardly decreases, the travel plan is revised so that the frequency of revision of the travel plan can be reduced and the increase of delay can be reduced.

In this case, the plan generating section may judge revision of the travel plan is unnecessary if the delay amount is less than a prescribed reference delay amount.

With this configuration, the travel plan can be prevented from being revised if delay is hardly occurring.

Furthermore, the plan generating section may judge, after execution of revision of the travel plan, revision of the travel plan is unnecessary until a certain period has elapsed.

Immediately after revision of the travel plan, deviation relative to the travel plan of vehicles is significant. Immediately after the revision, by not judging whether or not revision is necessary, the travel plan can be effectively prevented from being unnecessarily revised.

An operation management method disclosed in the present specification generates a travel plan for each of a plurality of vehicles traveling autonomously along a prescribed travel route on which are provided a plurality of stations, including at least departure timing at the stations; transmits to corresponding vehicles the generated travel plan; obtains a delay amount of the vehicles relative to the travel plan; and judges whether or not revision of the travel plan is necessary based on the obtained delay amount, and revises the travel plan if revision is necessary.

A transportation system disclosed in the present specification includes a plurality of vehicles traveling autonomously according to a travel plan along a prescribed travel route on which are provided a plurality of stations, and an operation management device for managing operation of the plurality of vehicles; wherein the operation management device includes a plan generating section for generating, as the travel plan, a plan for each of the plurality of vehicles, including at least departure timing at the stations, a communication device for transmitting to the corresponding vehicles the travel plan generated by the plan generating section, and an operation monitoring section for obtaining a delay amount of the vehicles relative to the travel plan; and wherein the plan generating section judges whether or not revision of the travel plan is necessary based on the delay amount obtained by the operation monitoring section, and revises the travel plan if the revision is necessary.

The art disclosed in the present specification can further improve the convenience of the transportation system.

BRIEF DESCRIPTION OF DRAWINGS

Embodiments of the present disclosure will be described based on the following figures, wherein:

FIG. 4 shows one example of a travel plan used in the transportation system of FIG. 1.

DESCRIPTION OF EMBODIMENTS

Figure 1:
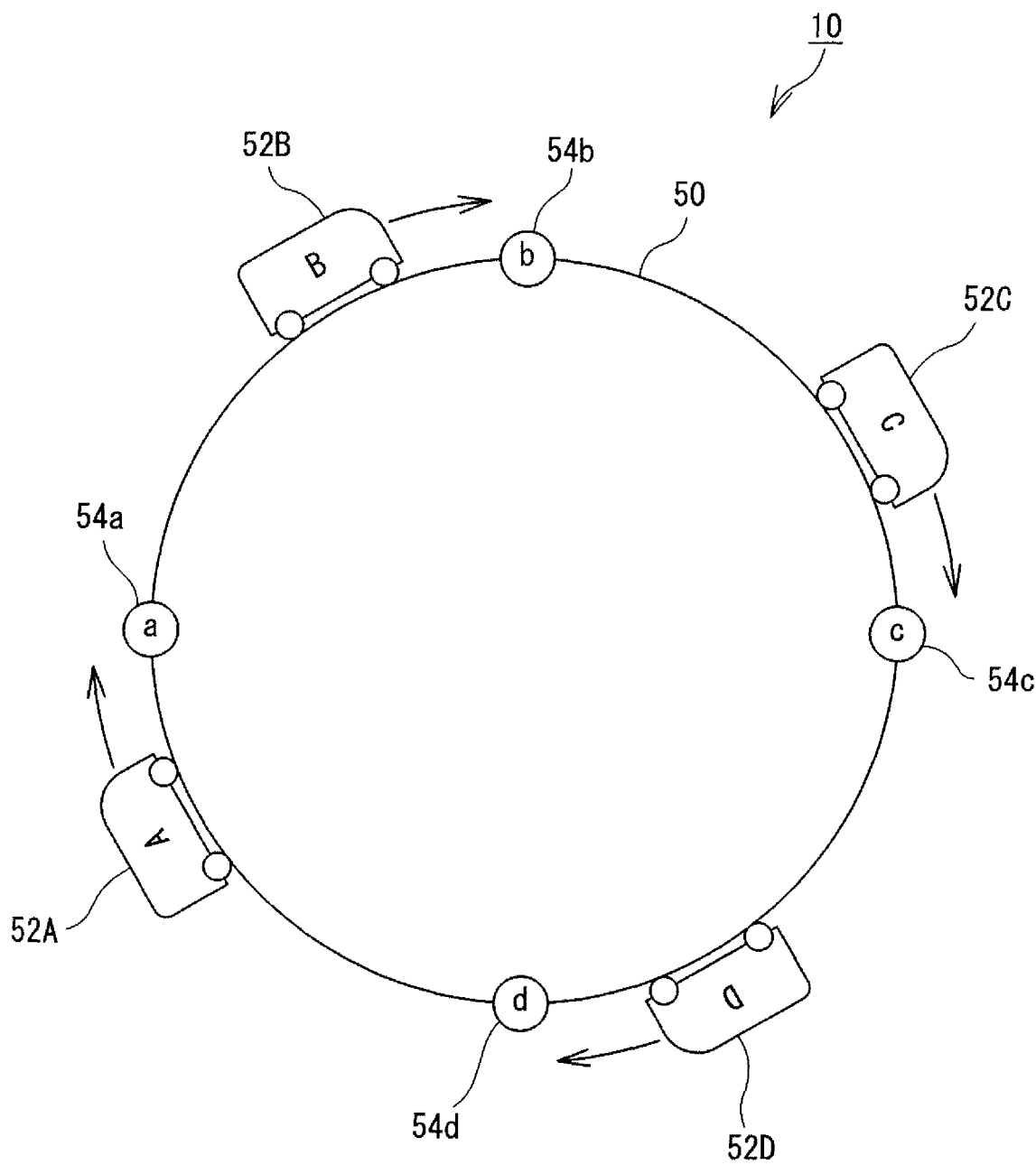
FIG. 1 is an image diagram of a transportation system.
Figure 2:
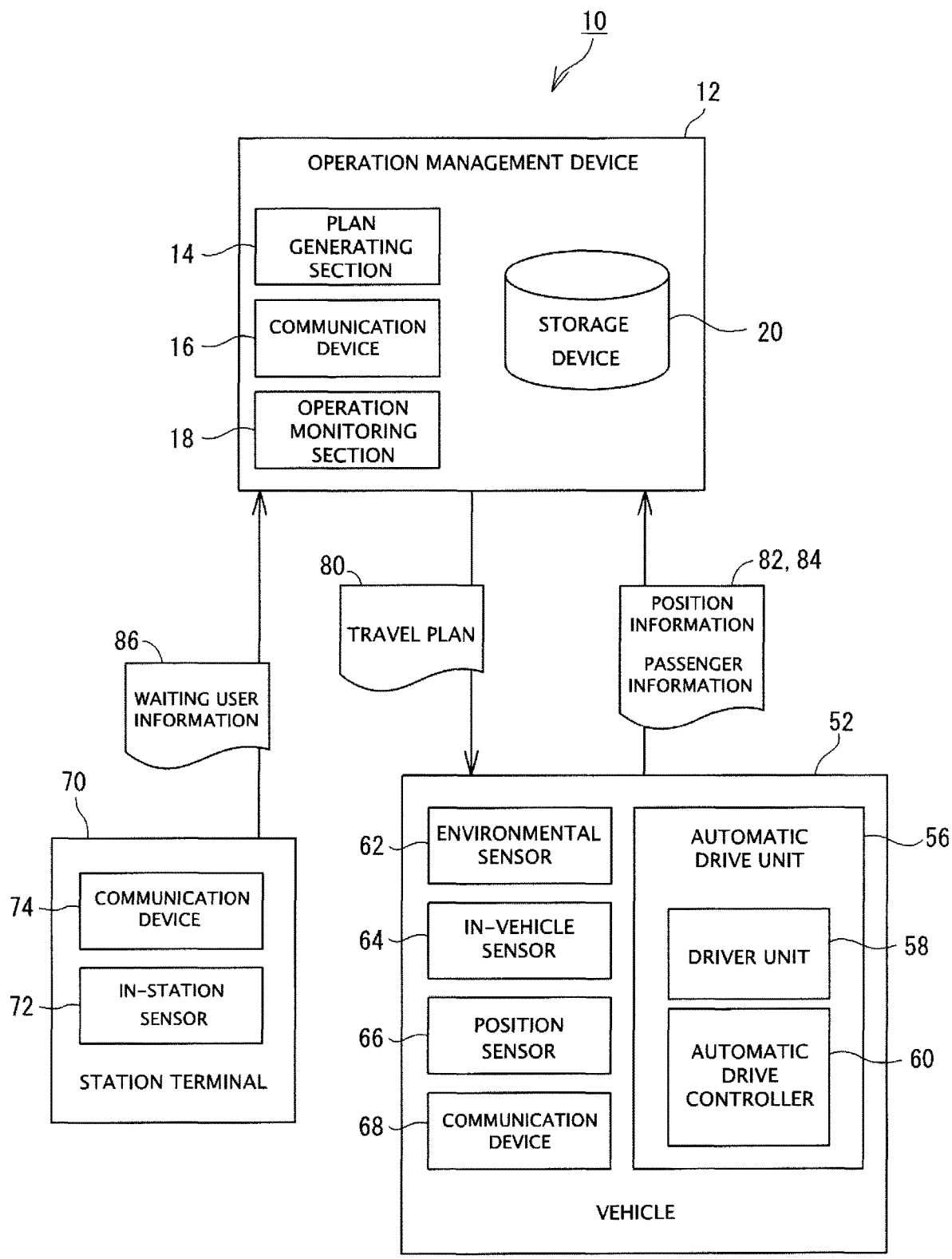
FIG. 2 is a block diagram of the transportation system.
Figure 3:
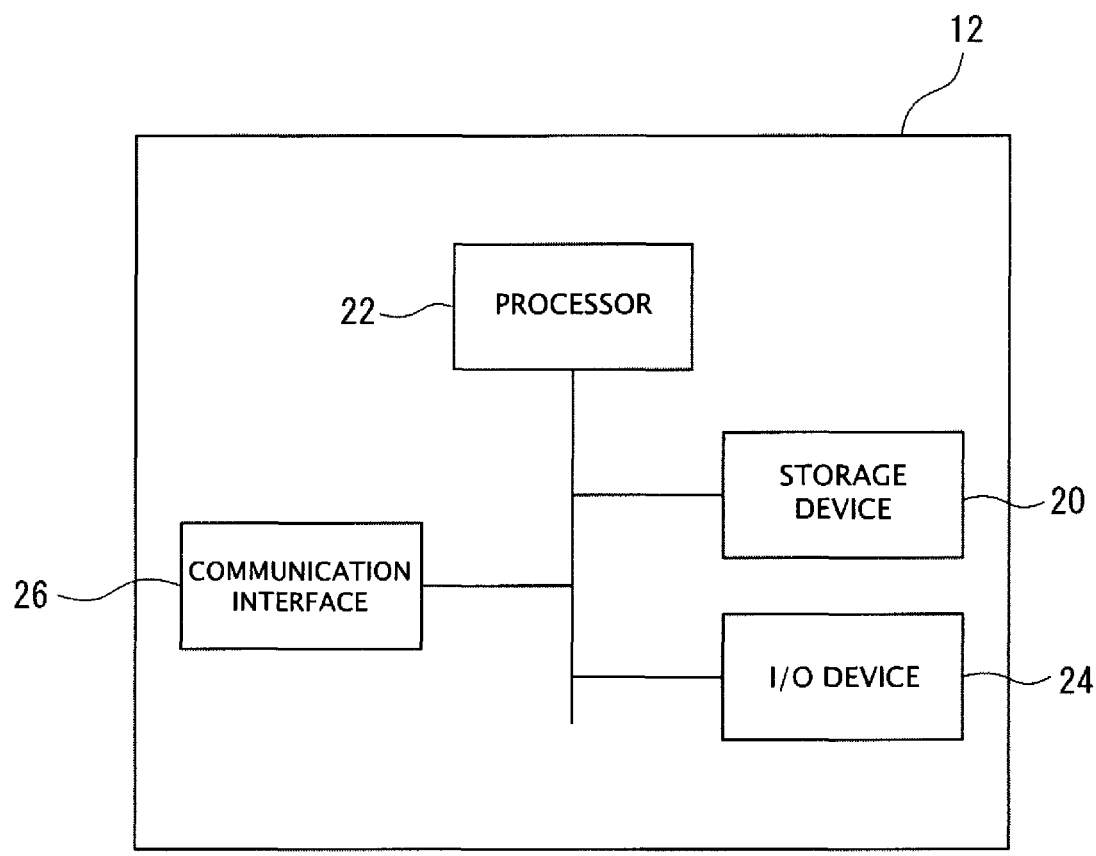
FIG. 3 is a block diagram showing a physical configuration of the operation management device.

A transportation system 10 will be described hereinafter with reference to the attached drawings. FIG. 1 shows an image of the transportation system 10 and FIG. 2 is a block diagram of the transportation system 10. Further, FIG. 3 is a block diagram showing the physical configuration of an operation management device 12.

The transportation system 10 is a system transporting a large indefinite number of users along a predetermined travel route 50. The transportation system 10 has vehicles 52A to 52D capable of traveling autonomously along the travel route 50. Furthermore, a plurality of stations 54a to 54d are arranged on the travel route 50. It should be noted that, hereinafter, if vehicles 52A to 52D are not distinguished, the suffix letter will be omitted and the notation will be "vehicle 52". Similarly, if stations 54a to 54d are not distinguished, the notation will be "station 54".

Vehicle 52 stops temporarily at each station 54. A user gets on the vehicle 52 or gets off the vehicle 52, taking advantage of the timing when the vehicle 52 temporarily stops. Therefore, in this example, each vehicle 52 functions as a passenger bus for transporting a large indefinite number of users from one station 54 to another station 54. The operation management device 12 (not shown in FIG. 1, refer to FIG. 2 and FIG. 3) manages the operation of the plurality of vehicles 52. In this example, the operation management device 12 controls the operation of the plurality of vehicles 52 for uniform headway operation. Uniform headway operation is a form of operation in which the interval between vehicle departures at each station is uniform. Therefore, if the interval between departures at the station 54a is 5 minutes, for example, uniform headway operation is a form of operation where the interval between departures at the other stations 54b, 54c, and 54d will also be 5 minutes.

Each of the components of the transportation system 10 will be explained in more detail. The vehicle 52 travels autonomously according to a travel plan 80 provided by the operation management device 12. The travel plan 80 defines the travel schedule of the vehicle 52. In this example, as will be explained in detail later, only the departure timing of the vehicles 52 at each station 54a to 54d is prescribed in the travel plan 80. The vehicle 52 travels autonomously so that it can depart at the departure timing specified in the travel plan 80. In other words, all judgments about the travel velocity between stations 54, stopping, for example at signal lights, overtaking other vehicles, and so forth, are made at the vehicle 52.

As shown in FIG. 2, the vehicle 52 has an automatic drive unit 56. The automatic drive unit 56 is broadly separated into a driver unit 58 and an automatic drive controller 60. The driver unit 58 is a basic unit for driving the vehicle 52 and includes, for example, a motor, a power transmission device, a brake device, a drive device, a suspension device, a steering device, and so forth. The automatic drive controller 60 controls the drive of the driver unit 58 and causes the vehicle 52 to travel autonomously. The automatic drive controller 60 is, for example, a computer having a processor and memory. This "computer" also includes a microcontroller, which incorporates a computer system into a single integrated circuit. Furthermore, the term "processor" refers to processors in a broad sense, and includes general-purpose processors (for example, CPU: Central Processing Units) and dedicated processors (for example, GPU: Graphic Processing Units, ASIC: Application Specific Integrated Circuits, FPGA: Field Programmable Gate Arrays, programmable logic devices, and so forth).

To achieve autonomous driving, the vehicle 52 is further equipped with an environmental sensor 62 and a position sensor 66. The environmental sensor 62 detects the surrounding environment of the vehicle 52 and includes, for example, a camera, Lidar, millimeter wave radar, sonar, magnetic sensor, and so forth. The automatic drive controller 60 detects the type of objects in the vicinity of the vehicle 52, the distance to the objects, road surface markings (for example, white lines) on the travel route 50, traffic signs, and so forth, based on the detection results from the environmental sensor 62. Further, the position sensor 66 detects the current position of the vehicle 52, and is, for example, a GPS device. The detection results from the position sensor 66 are also sent to the automatic drive controller 60. The automatic drive controller 60 controls acceleration, deceleration, and steering of the vehicle 52 based on the detection results of the environmental sensor 62 and the position sensor 66. Moreover, the detection results from the position sensor 66 are transmitted to the operation management device 12 as position information 82.

The vehicle 52 is further provided with an in-vehicle sensor 64 and a communication device 68. The in-vehicle sensor 64 is a sensor that detects the interior state of the vehicle 52, in particular the number and attributes of passengers. The attributes may include at least one, for example, of the following: use or nonuse of a wheelchair, use or nonuse of a white cane, use or nonuse of a stroller, use or nonuse of an orthotic device, or an age group. Such in-vehicle sensors 64 are, for example, cameras that take images of the interior of the vehicle, weight sensors that detect the total passenger weight, and so forth. The information detected by the in-vehicle sensor 64 is transmitted to the operation management device 12 as passenger information 84.

The communication device 68 is a device that communicates wirelessly with the operation management device 12. The communication device 68 can, for example, communicate over the Internet via a wireless LAN such as Wi-Fi (registered trademark) or mobile data communication services provided by cellular telephone companies. The communication device 68 receives the travel plan 80 from the operation management device 12 and transmits position information 82 and passenger information 84 to the operation management device 12.

Each station 54 is provided with a station terminal 70. The station terminal 70 has a communication device 74 and an in-station sensor 72. The in-station sensor 72 is a sensor for detecting the state of the station 54, in particular the number and attributes of people waiting in the station 54 for the vehicle 52. The in-station sensor 72 is, for example, a camera for capturing an image of the station 54, a weight sensor for detecting the total weight of the waiting users, and so forth. Information detected by the in-station sensor 72 is transmitted to the operation management device 12 as waiting user information 86. A communication device 16 is provided to enable transmission of the waiting user information 86.

The operation management device 12 monitors the operation status of the vehicle 52 and controls the operation of the vehicle 52 according to the operation status. As shown in FIG. 3, the operation management device 12 is physically a computer having a processor 22, a storage device 20, an I/O device 24, and a communication interface 26. The term "processor" may refer to processors in a broad sense, and includes general-purpose processors (for example, CPUs) and dedicated processors (for example, GPUs, ASICs, FPGAs, programmable logic devices, and so forth). Further, the storage device 20 may include at least a semiconductor memory (for example, RAM, ROM, solid-state drive, and so forth) or a magnetic disk (for example, hard disk drive). In FIG. 3, the operation management device 12 is shown as a single computer. However, the operation management device 12 may consist of multiple, physically discrete computers.

As shown in FIG. 2, the operation management device 12 functionally has a plan generating section 14, the communication device 16, an operation monitoring section 18, and the storage device 20. The plan generating section 14 generates the travel plan 80 for each of the plurality of vehicles 52. Further, the plan generating section 14 revises and regenerates the once-generated travel plan 80 depending on the operation status of the vehicles 52. Generation and revision of the travel plan 80 will be described in detail hereinafter.

The communication device 16 is a device for wireless communications between the vehicle 52 and the station terminal 70, and can communicate, for example, over the internet using WiFi or mobile data communication services. The communication device 16 transmits the travel plan 80 generated and regenerated by the plan generating section 14 to the vehicle 52, and receives position information 82, passenger information 84, and waiting user information 86 from the vehicle 52 and the station terminal 70.

The operation monitoring section 18 obtains an operation status of the vehicle 52 based on the position information 82 transmitted from each vehicle 52. More specifically, the operation monitoring section 18 compares the position of each vehicle 52 with the travel plan 80, and calculates a delay amount AD for the vehicle 52 relative to the travel plan 80. The delay amount AD is an indicator expressing a degree of delay and may be, for example, a delay time TD of the vehicle 52 relative to a target time, or a delay distance of the vehicle 52 relative to a target position. Furthermore, the delay amount AD may express a degree of delay for one vehicle 52 or express a delay tendency for the plurality of vehicles 52A to 52D. Therefore, the delay amount AD may be the delay time TD or delay distance for one vehicle 52, or a statistical value (for example, average value or maximum value) of the delay time TD or delay distance for the plurality of vehicles 52A to 52D. Moreover, the delay amount AD, as will be detailed hereinafter, may be a weighted-sum value of multiple parameters (for example, delay time TD and a maximum inter-vehicle time TVmax). In any case, the delay amount AD obtained by the operation monitoring section 18 is temporarily stored in the storage device 20. The plan generating section 14 judges whether or not revision of the travel plan 80 is necessary based on this delay amount AD, which will also be described hereinafter.

The storage device 20 stores various programs and data for the operation management device 12 of the plurality of vehicles 52.

Next, the generation and revision of the travel plan 80 in the operation management device 12 will be described in detail. FIG. 4 shows an example of the travel plan 80 used in the transportation system 10 of FIG. 1. In the example of FIG. 1, the transportation system 10 has four vehicles 52A to 52D, and has four stations 54a to 54d arranged with uniform headway on the travel route 50. Furthermore, in this example, the time necessary for each vehicle 52 for one circuit of the travel route 50, namely, a circuit time TC, is 20 minutes.

In this case, the operation management device 12 generates the travel plan 80 so that the departing interval of the vehicle 52 at each station 54 is the circuit time TC divided by the number of vehicles 52, or 20/4=5 minutes. As shown in FIG. 4, the travel plan 80 is recorded only with the departure time of each vehicle 54. For example, a travel plan 80D transmitted to the vehicle 52D is recorded with the respective target departure time at the stations 54a to 54d.

Furthermore, the travel plan 80 is recorded with the time schedule for only one circuit, and transmitted from the operation management device 12 to the vehicle 52 at a timing when each vehicle 52 arrives at a specific station, for example, station 54a. For example, the vehicle 52C receives from the operation management device 12 a travel plan 80C for one circuit at a timing (for example, around 6:50) when arriving at the station 54a, and the vehicle 52D receives from the operation management device 12 the travel plan 80D for one circuit at a timing (for example, around 6:45) when arriving at the station 54a.

Figure 5:
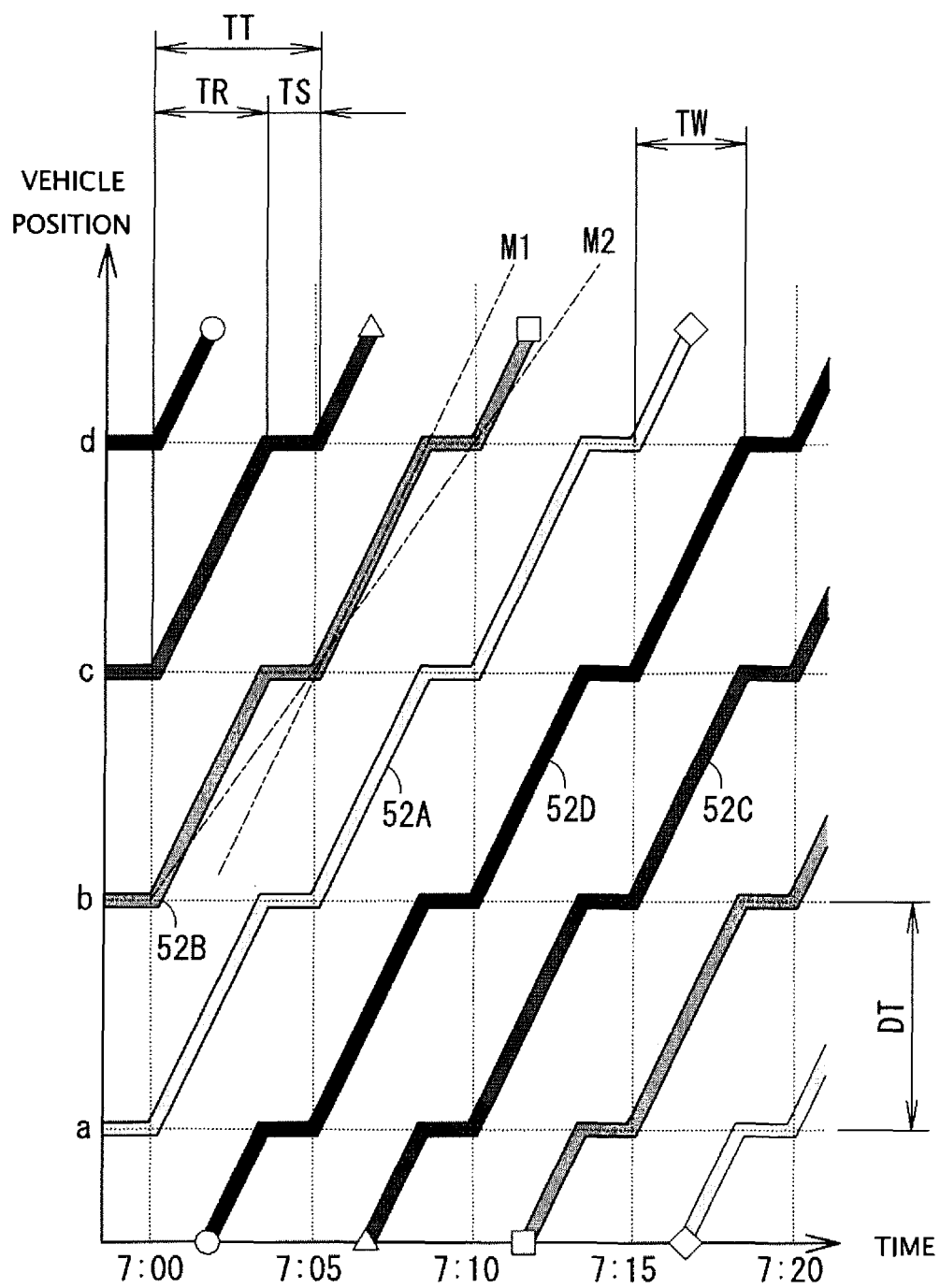
FIG. 5 is a timing chart of each vehicle traveling autonomously according to the travel plan of FIG. 4.

Each vehicle 52 travels autonomously according to the received travel plan 80. FIG. 5 is a timing chart for the vehicles 52A to 52D traveling autonomously according to the travel plan 80 of FIG. 4. In FIG. 5, the horizontal axis and the vertical axis represent the time and the position of the vehicle 52, respectively. Before describing the traveling of each vehicle 52, the definitions of various parameters to be used in the description hereinafter will be briefly described.

In the following description, the distance from one station 54 to the next station 54 is called an "inter-station distance DT". Furthermore, the time between the vehicle 52 departing one station 54 and departing the next station 54 is called a "required inter-station time TT" and the time the vehicle 52 stops at the station 54 for user boarding and deboarding is called a "stop time TS". Moreover, the time from departing one station 54 until arriving at the next station 54, namely, the stop time TS subtracted from the required inter-station time TT, is called an "inter-station travel time TR".

Furthermore, a value obtained by dividing traveled distance by travel time, including the stop time TS, is called a "scheduled velocity VS" and a value obtained by dividing traveled distance by travel time, not including the stop time TS, is called an "average travel velocity VA". The slope of line M1 in FIG. 5 represents the average travel velocity VA and the slope of line M2 in FIG. 5 represents the scheduled velocity VS.

According to the travel plan 80 in FIG. 4, the vehicle 52A, after leaving the station 54a at 7:00, must depart the station 54b five minutes later at 7:05. The average travel velocity VA is controlled so that the vehicle 52A completes movement from the station 54a to the station 54b, and user boarding and deboarding during the five minute period.

Described more specifically, the vehicle 52 stores the standard stop time TS for users in advance as a planned stop time TSp. The vehicle 52 then calculates the target arrival time at the next station 54 as the departure time specified in the travel plan 80 minus this planned stop time TSp. For example, if the planned stop time TSp is one minute, the target arrival time for the vehicle 52A at the station 54b is 7:04. The travel velocity is controlled so that the vehicle 52 arrives at the next station 54 by the target arrival time calculated in this manner.

However, some or all of the vehicles 52 may be delayed relative to the travel plan 80 due to congestion on the travel route 50 or an increase in the number of users. If such a delay occurs, the delayed vehicle 52 will attempt to eliminate the delay by increasing the average travel velocity VA to shorten the inter-station travel time TR, or by shortening the stop time TS at the next station 54. Hereinafter, when the delayed vehicle 52 eliminates the delay by reducing the inter-station travel time TR or the stop time TS, this is called "vehicle delay recovery".

Figure 6:
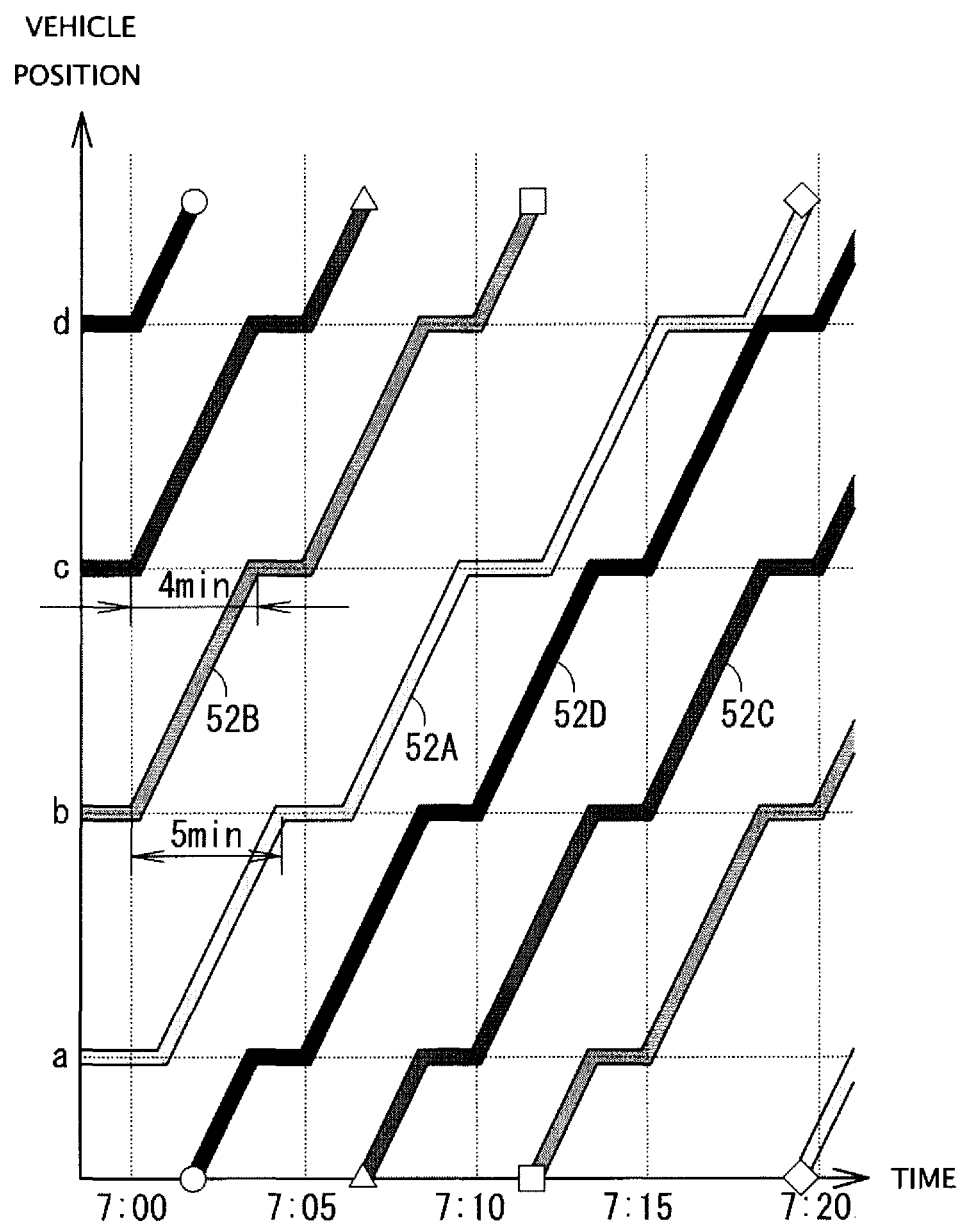
FIG. 6 shows a time schedule when vehicle delay occurs.

However, there are instances when vehicle delay recovery is difficult depending on transportation demand and traffic congestion. In particular, if the inter-station distance DT is short, it is difficult to shorten the inter-station travel time TR, and reduction of the stop time TS becomes important for eliminating delay. However, uneven distancing between vehicles due to delays may cause a negative spiral to occur, in which users congregate at the delayed vehicles 52, thereby increasing the stop time TS and further worsening the delay. This negative spiral will be described with reference to FIG. 6. FIG. 6 shows the time schedule when the vehicle 52A is delayed.

In the example of FIG. 6, each vehicle 52, under normal conditions with no delays, travels from one station to the next station 54 in four minutes (namely, TR=4 minutes) and stops for one minute at each station 54 for user boarding and deboarding (namely, TS=1 minute). Here, after the vehicle 52A arrives at the station 54a, suppose the boarding and deboarding of users take time and the stop time TS is two minutes. In this case, the vehicle 52A ends up leaving the station 54a one minute late.

In order to recover from this one-minute delay, the vehicle 52A must, in principle, increase its average travel velocity VA and shorten the inter-station travel time TR. However, when the inter-station distance DT is short, substantially shortening the inter-station travel time TR is difficult even if the average travel velocity VA is slightly increased.

In the example of FIG. 6, due to this reason, the vehicle 52A arrives one minute late at the station 54b without being able to eliminate delay. Here, if a delay is not occurring, the time (hereinafter referred to as maximum wait time TW) at each station 54 when one vehicle 52 departs until the next vehicle 52 arrives is four minutes. However, as shown in FIG. 6, if an arrival at the station 54b of the vehicle 52A is one minute late, the maximum wait time TW at the station 54b when the vehicle 52B departs until the vehicle 52A arrives becomes five minutes. In this case, the number of users desiring to board the vehicle 52A is likely to be more compared to when there is no delay. Then, as the number of users increases, the stop time TS of the vehicle 52A at the station 54b also increases, thereby making delays even more likely to increase. Then, as the delay increases, the maximum wait time TW at the next station 54c, as well as the number of users, increases more, thereby further increasing the delay.

Figure 7:
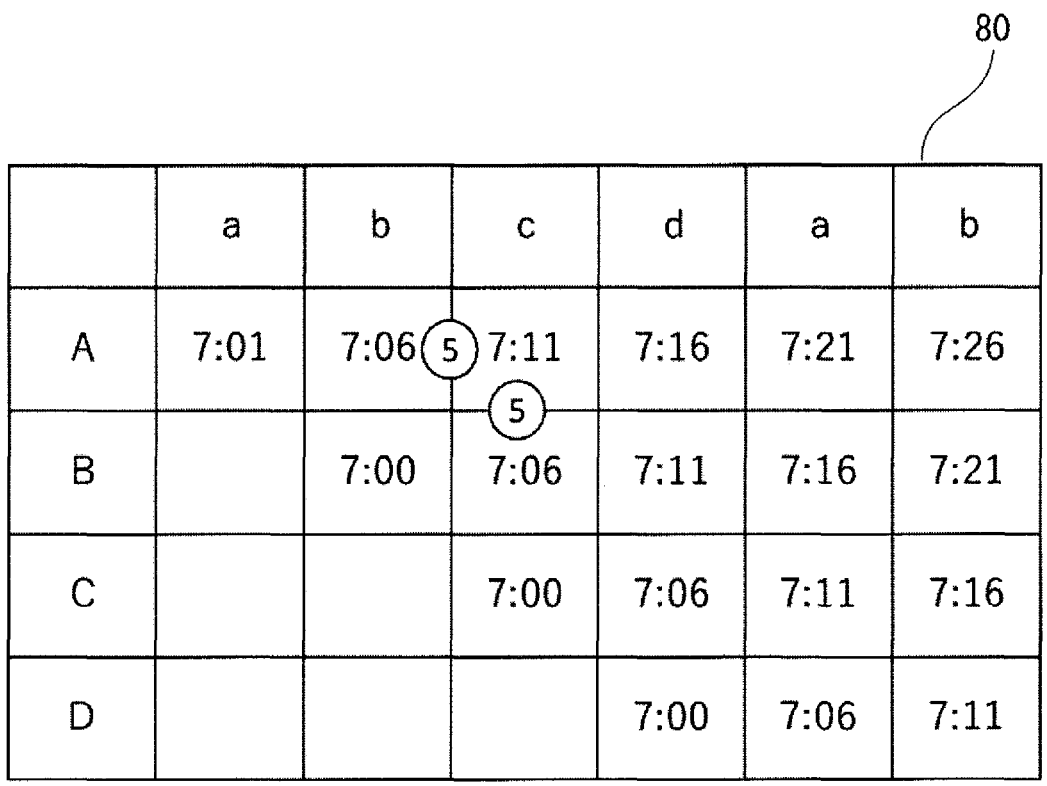
FIG. 7 shows one example of a revised travel plan.

In this manner, once a delay occurs, it causes the delay to further increase and the negative spiral occurs. Therefore, the operation management device 12 obtains the delay time TD of each vehicle 52, and depending on the magnitude of this delay time TD, the travel plan 80 itself is revised and regenerated. The revision of the travel plan 80 includes the modification of departure timing of some or all of the vehicles 52. For example, the departure timing in the travel plan 80 of each vehicle 52 may be delay with the delayed vehicle 52 as reference. For example, if the departure of the vehicle 52A is delayed one minute at the station 54a, the travel plan 80 may be revised, as shown in FIG. 7, so that the departure timing of all vehicles 52 including the vehicle 52A is delayed one minute. Such a configuration prevents the maximum wait time TW from gradually increasing and prevents users from congregating on some of the vehicles 52. As a result, a further increase in delay can be prevented.

Figure 8:
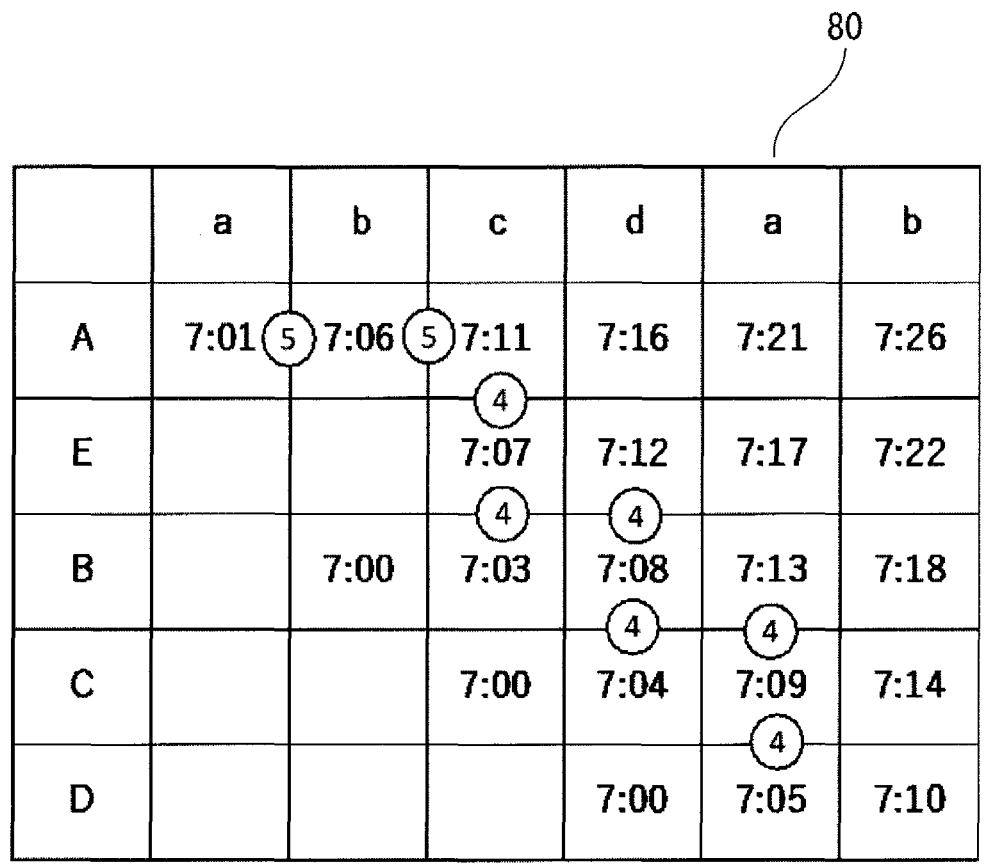
FIG. 8 shows another example of a revised travel plan.

Furthermore, revision of the travel plan 80 may also include modification of the number of vehicles 52. For example, a new vehicle 52 may be added before the delayed vehicle 52. For example, if the departure of the vehicle 52A at the station 54a is delayed one minute, a new vehicle 52E may be additionally added between the vehicle 52A and the vehicle 52B. In this case, as shown in FIG. 8, the travel plan 80 is revised so that the departure interval for the vehicles 52 at each station 54 becomes 20/5=4 minutes.

In this manner, modifying and regenerating the travel plan 80 itself so that uniform headway travel is achieved when a delay of the vehicle 52 occurs can more reliably maintain a uniform headway operation. However, if the travel plan 80 is revised too frequently, it is meaningless to set up plans and the reliable transportation of users will be impaired. Therefore, the operation management device 12 obtains the delay amount AD for each vehicle 52 and judges whether or not revision of the travel plan 80 is necessary based on the delay amount AD. The judgment by the operation management device 12 on whether or not revision of the travel plan 80 is necessary will be described in detail hereinafter.

As described above, each vehicle 52 sends its position information 82 to the operation management device 12. The operation monitoring section 18 calculates the delay amount AD relative to the travel plan 80 of each vehicle 52 based on the position information 82. Calculation of the delay amount AD may be performed at a regular time interval, or at a timing when the vehicle 52 arrives at or departs from a specific position (for example, specific station 54). Furthermore, the respective delay amount A) for the plurality of vehicles 52A to 52D may be calculated simultaneously or at separate times. For example, the respective delay amount AD for the plurality of vehicles 52A to 52D may be calculated at periodic intervals. Moreover, in another embodiment, the delay amount AD of the vehicle 52A may be calculated at a timing when the vehicle 52A departs from the station 54a, and the delay amount AD of the vehicle 52D may be calculated at a timing when the vehicle 52D departs from the station 54a.

Figure 9:
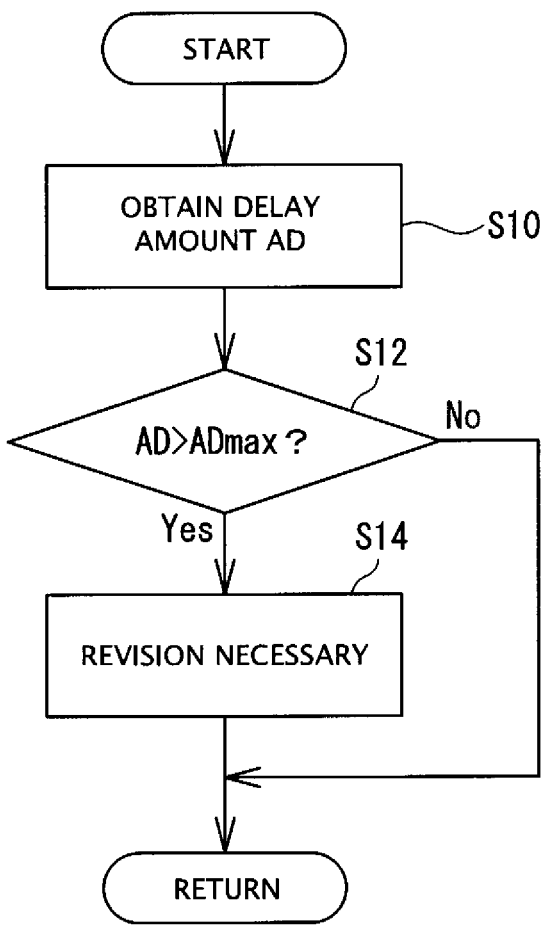
FIG. 9 is a flowchart showing the most basic flow of judging whether revision of the travel plan is necessary.

The plan generating section 14 of the operation management device 12 judges whether or not revision of the travel plan 80 is necessary based on the delay amount AD calculated in this manner. FIG. 9 is a flowchart of the most basic flow of judging necessity. In the example of FIG. 9, the plan generating section 14 receives (S10) the delay amount AD from the operation monitoring section 18, and then compares (S12) the delay amount AD with a predetermined allowable delay amount ADmax. If, as a result of the comparison, the delay amount AD exceeds the allowable delay amount ADmax (yes at S12), the plan generating section 14 judges revision of the travel plan 80 is necessary (S14).

Figure 10:
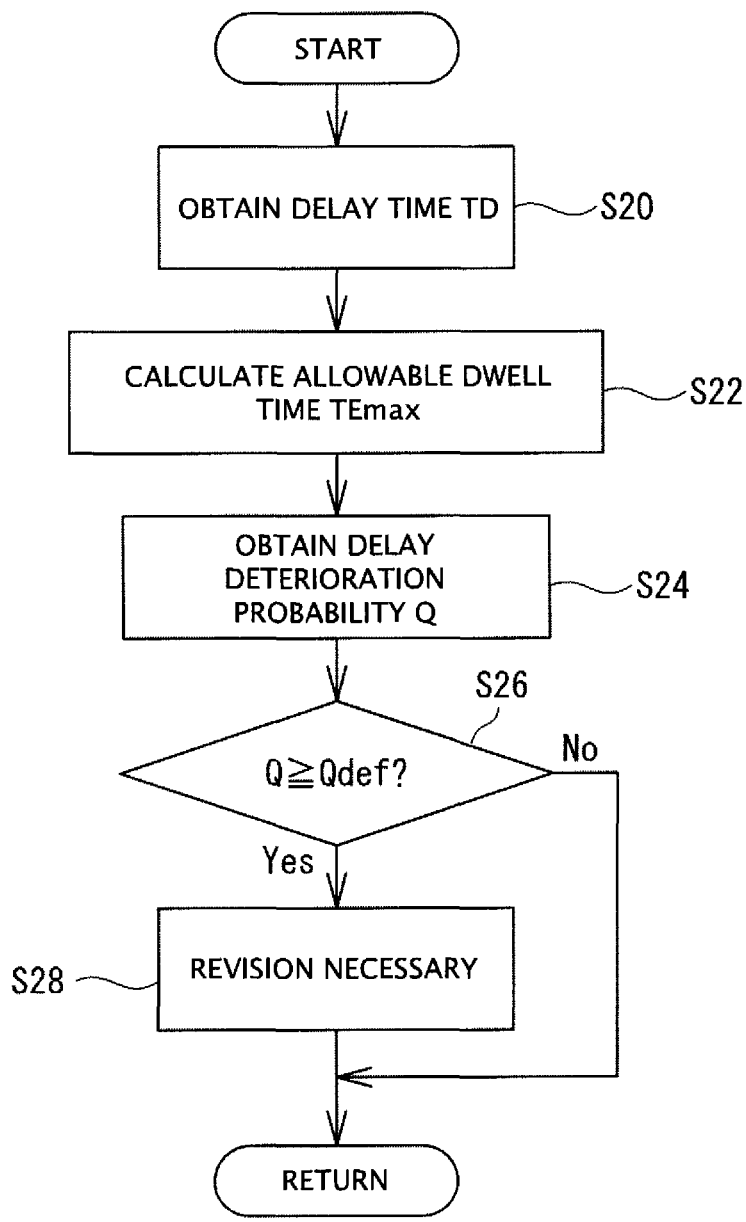
FIG. 10 is a flowchart showing another flow of judging whether revision of the travel plan is necessary.

Furthermore, in another embodiment, the probability of the delay increasing from the delay amount AD, namely, a delay deterioration probability Q, is obtained, and the judgment on whether or not revision of the travel plan 80 is necessary may be made based on the delay deterioration probability Q. FIG. 10 is a flowchart illustrating the judgment flow in this case.

As shown in FIG. 10, the plan generating section 14 obtains the delay time TD (S20) as the delay amount AD from the operation monitoring section 18 when delay of the vehicle 52 occurs. Then, the plan generating section 14 calculates (S22) an allowable dwell time, namely, an allowable dwell time TEmax, for recovering from the delay based on the delay time TD. The allowable dwell time TEmax is a value obtained by subtracting a target reduction time T* from the sum of the planned stop time TSp and a reduction travel time $\Delta$TR. Namely, the allowable dwell time TEmax is expressed in expression 1 below.

$$TE\max = TSp + \Delta TR - T^* \qquad \text{Expression 1}$$

Here, the reduction travel time $\Delta$TR is the inter-station travel time TR that can be shortened by improving the average travel velocity VA. Furthermore, the target reduction time T* is an expected target reduction time for recovering from a delay. The target reduction time T* is usually equal to the delay time TD.

Here, a reduction amount $\Delta$TS of the stop time TS is a value obtained by subtracting the dwell time TE from the planned stop time TSp, namely, $\Delta$TS=TSp−TE. To recover from a delay, it is necessary for the reduction amount of the operation time or ($\Delta$TS+$\Delta$TR)=(TSp−TE+$\Delta$TR) to be greater than the target reduction time T*. In other words, it is necessary for TSp−TE+$\Delta$TR>T* to be satisfied for delay recovery. Rearranging this expression yields TE<TSp+$\Delta$TR−T* and it can be seen the allowable dwell time TEmax can be obtained from expression 1.

Specific numerical values will be given in an example. For example, if a delay is not occurring, suppose that the inter-station travel time TR for the vehicle 52A is four minutes and the planned stop time TSp is one minute. Then, the delay time TD when the vehicle 52A departs from the station 54a is two minutes, and a case is considered where it is desired to recover from this two minute delay before the vehicle 52A completely travels one circuit of the travel route 50. In this case, since the travel route 50 is provided with the four stations 54a to 54d, the total value of the planned stop time TSp is 1×4=4 minutes. Furthermore, by improving the average travel velocity VA, suppose the reduction time $\Delta$TR of the inter-station travel time is a total of three minutes. In this case, the allowable dwell time TEmax=44+3−2=5 minutes and the allowable dwell time TEmax per station becomes 5/4=1.25 minutes. The 1.25 minutes becomes the acceptable allowable dwell time TEmax for recovering from the delay.

If the allowable dwell time TEmax can be calculated, the plan generating section 14 calculates (S24) the probability of the dwell time TE exceeding the allowable dwell time TEmax, namely, the delay deterioration probability Q. To calculate the delay deterioration probability Q, the operation management device 12 stores a dwell time distribution 90 to the storage device 20. FIG. 1I shows one example of the dwell time distribution 90.

Figure 11:
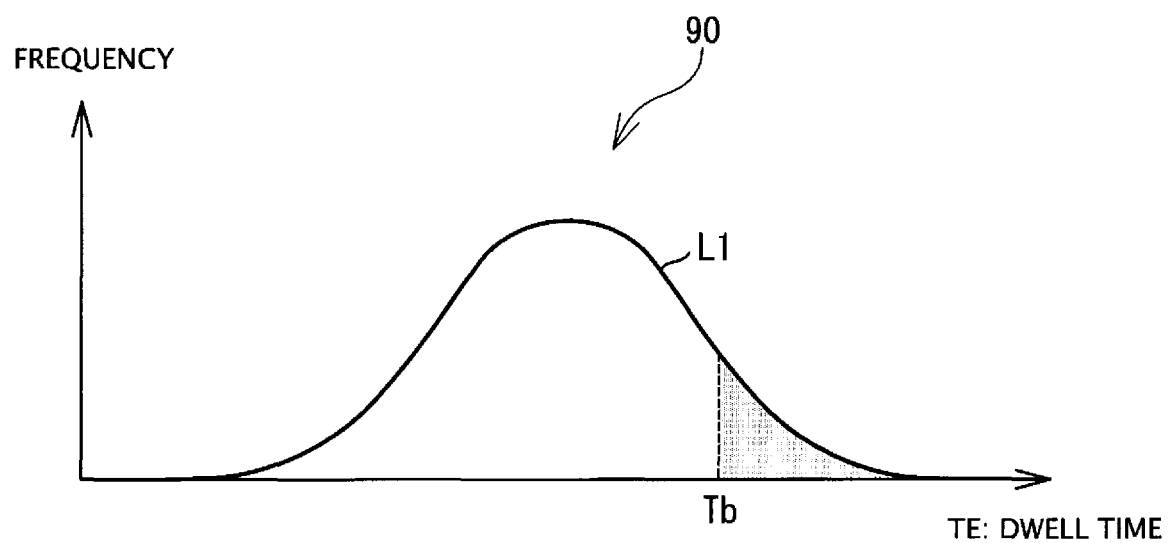
FIG. 11 shows an example of dwell time distribution.

The dwell time distribution 90 shows the frequency of occurrence of the dwell time TE at each station 54. In FIG. 11, the horizontal axis represents the dwell time TE and the vertical axis represents the frequency of occurrence. The dwell time distribution 90 may be created based on actual data obtained from the actual operation of the transportation system 10, or they may be created based on simulations.

Furthermore, the dwell time distribution 90 may be revised as appropriate according to time and day, for example, and this will be described hereinafter.

The plan generating section 14 calculates the delay deterioration probability Q by comparing the calculated allowable dwell time TEmax with the dwell time distribution 90. For example, suppose the allowable dwell time TEmax is Tb in FIG. 11. In this case, the delay deterioration probability Q can be obtained by dividing the area (shaded area in FIG. 11) where TE≥Tb in the area enclosed by a distribution curve L1 by the total area.

If the delay deterioration probability Q can be calculated, the plan generating section 14 compares (S26) the delay deterioration probability Q with a pre-stored reference delay deterioration probability Qdef. The reference delay deterioration probability Qdef is a maximum allowable value of the delay deterioration probability Q. The value of the reference delay deterioration probability Qdef is not particularly limited, but may be a value, for example, 50% or lower, or 30% or lower.

As a result of the comparison, if the delay deterioration probability Q is less than the reference delay deterioration probability Qdef (no at S26), the vehicle 52 has a high probability of being capable of vehicle delay recovery and the plan generating section 14 judges that revision of the travel plan 80 is unnecessary. On the other hand, if the delay deterioration probability Q is greater than or equal to the reference delay deterioration probability Qdef (yes at S26), the probability of being capable of vehicle delay recovery is low and, if the situation continues, the plan generating section 14 judges that the probability of a negative spiral occurring is high. In this case, the plan generating section 14 judges that revision of the travel plan 80 of some or all of the vehicles 52 is necessary (S28). If the travel plan 80 is revised and regenerated by the plan generating section 14, the communication device 16 transmits the regenerated travel plan 80 to each of the corresponding vehicles 52. Once each vehicle 52 receives the revised travel plan 80, the travel velocity and stop time thereof is modified so that the revised travel plan 80 can be satisfied.

Figure 12:
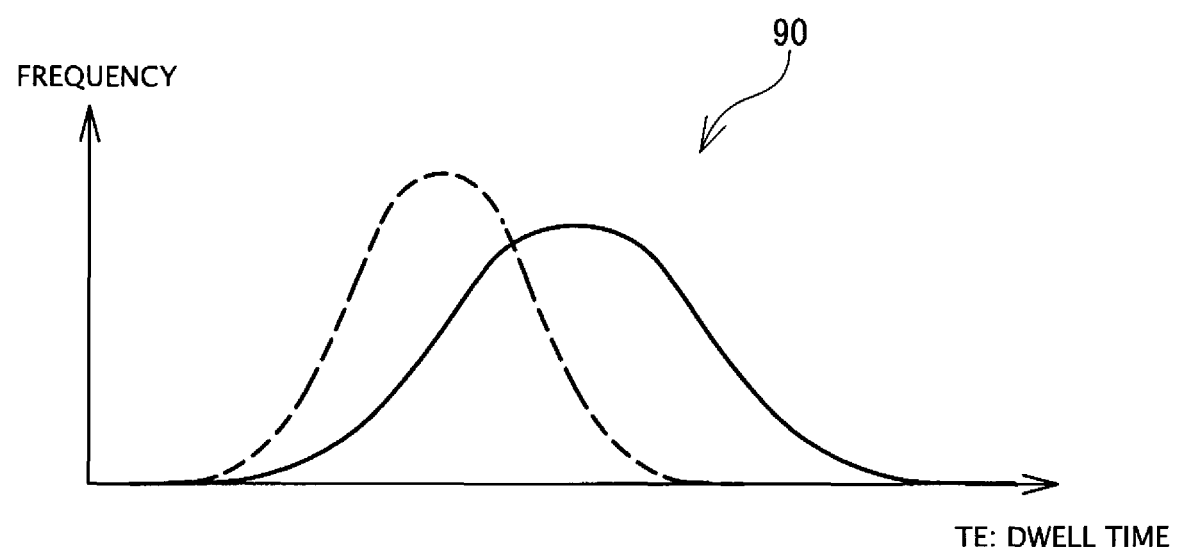
FIG. 12 shows a revised dwell time distribution.

Here, to calculate the delay deterioration probability Q at a high accuracy, the dwell time distribution 90 must be accurate. Thus, to improve the accuracy of the dwell time distribution, the dwell time distribution 90 may be revised as appropriate based on at least one of the following: date and time, delay status, reservation status, passenger information 84 sent from the vehicle 52, and waiting user information 86 sent from the station terminal 70. FIG. 12 shows one example of revision of the dwell time distribution 90 where the broken line and solid line represent the dwell time distribution 90 before revision and after revision, respectively.

Here, the number of users of the vehicle 52 fluctuates substantially depending on the date and time. For example, the number of users and the dwell time TE differ substantially between weekdays and holidays, and between commuting hours and daytime. Thus, the dwell time distribution 90 may be changed according to the date and time. Furthermore, if some of the vehicles 52 are delayed and the maximum wait time TW at the station 54 increases, the dwell time TE at the station is naturally likely to increase. Thus, the dwell time distribution 90 may be modified according to the delay status. Furthermore, if the transportation system 10 has received boarding reservations, it is possible to predict to some extent the number of users and also the dwell time based on the number of reservations. Thus, the dwell time distribution 90 may be modified according to the reservation status.

Furthermore, the number and attributes of users may be detected and the dwell time distribution 90 may be revised according to the detected result. For example, the dwell time distribution 90 may be revised based on at least either the passenger information 84 sent from the vehicle 52 or the waiting user information 86 sent from the station terminal 70.

Here, the waiting user information 86 relates to the users waiting for the vehicle 52 at the station 54, and may be, for example, image data captured within the station by camera. The plan generating section 14 analyzes the image data and extracts the number of users waiting at the station 54. The plan generating section 14 periodically receives the waiting user information 86 and calculates an amount of increase of waiting users per unit of time. Then, based on the obtained amount of increase, the vehicle 52 estimates the total number of waiting users at the time the station is reached. Here, the more users waiting, the more likely the dwell time TE will increase. Thus, the plan generating section 14 may revise the dwell time distribution 90 so that the dwell time TE increases as the total number of estimated waiting users increases.

Furthermore, the plan generating section 14 may revise the dwell time distribution 90 by taking into consideration attributes of waiting users in addition to the number of waiting users. Here, the attributes of waiting users are characteristics relating to the dwell time TE of each waiting user, and may include, for example, at least one of the following: use or nonuse of a wheelchair, use or nonuse of a white cane, use or nonuse of an orthotic device, use or nonuse of a baby stroller, and age group. Generally, if a waiting user uses a wheelchair, white cane, orthotic device, or baby stroller, the time necessary for boarding and deboarding increases compared to when one is not used. Furthermore, infants and the elderly require more time for boarding and deboarding than waiting users of other age groups. Thus, according to these attributes, the dwell time of waiting users at the station 54 can be estimated, and the dwell time distribution 90 can be modified based on the estimate. These attributes can be extracted by being recognized from the obtained image data using known image recognition technology.

For example, in this case, the plan generating section 14 is preset with a boarding and deboarding cost per attribute. The boarding and deboarding cost becomes higher, for example, for attributes for which the time required increases for boarding and deboarding. Furthermore, the plan generating section 14 analyzes the image data of the station 54 transmitted as waiting user information 86, and extracts the number and attributes of waiting users. Then, based on the extracted attributes, the boarding and deboarding cost of each and every waiting user is calculated, then the boarding and deboarding costs are totaled. The total value is the overall boarding and deboarding cost for the station. The plan generating section 14 may revise the dwell time distribution 90 so that the dwell time TE increases as the overall boarding and deboarding cost for the station increases.

Furthermore, the passenger information 84 relates to the passengers for the vehicle 52, and may be, for example, image data captured within the vehicle by an in-vehicle camera. As with the waiting user information 86, the plan generating section 14 also analyzes the image data functioning as passenger information 84 and extracts the number of passengers occupying the vehicle 52 or the number and attributes of passengers. Then, the dwell time distribution 90 may be revised so that the dwell time TE increases as the number of passengers increases or the passenger boarding and deboarding cost increases.

In this manner, since the dwell time distribution 90 is revised according to changing situations, such as date and time, delay status, and so forth, the accuracy of the dwell time distribution 90 and also the accuracy of the delay deterioration probability Q can be improved. Then, as a result, the travel plan 80 can be revised with more suitable timing.

Figure 13:
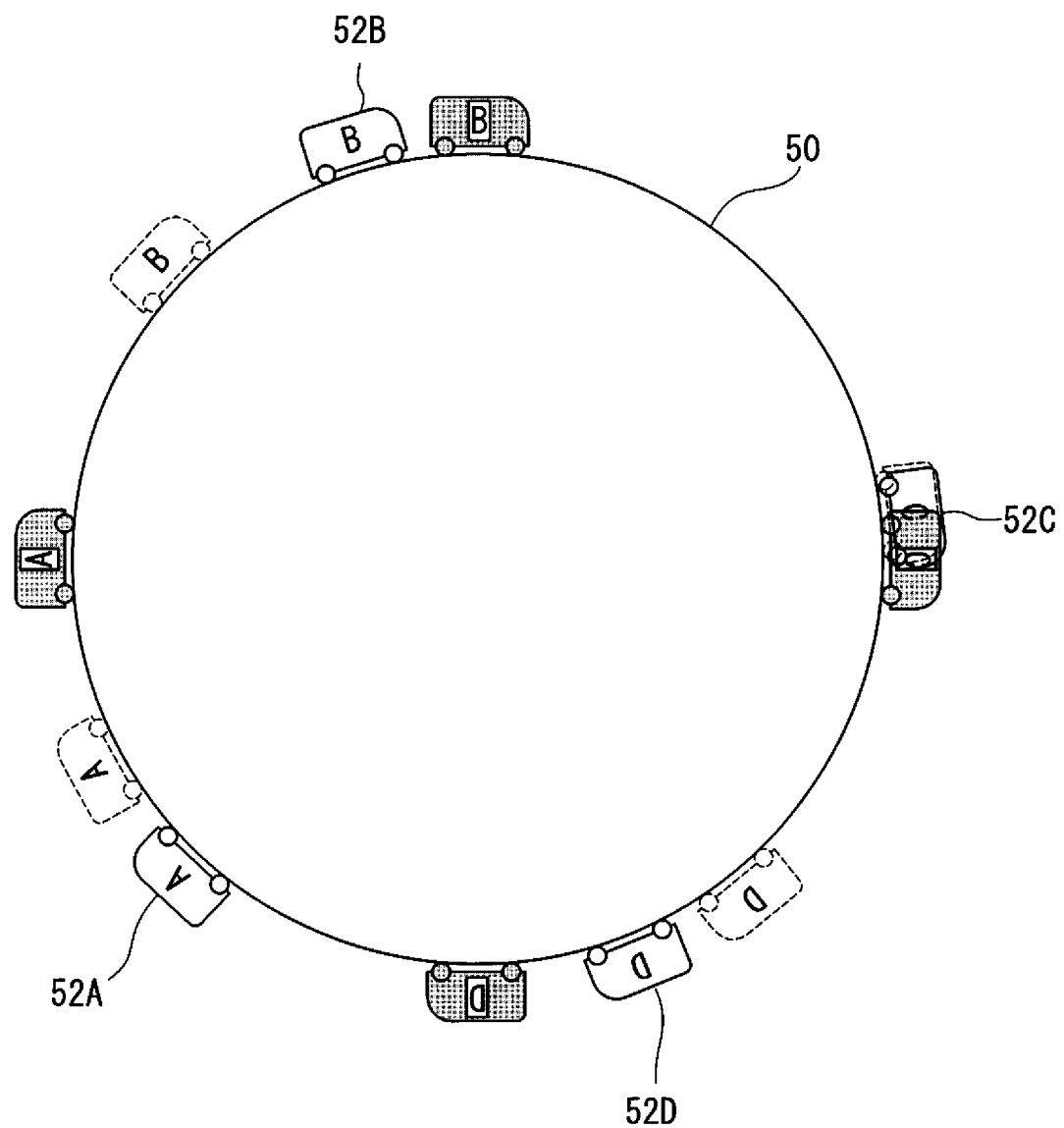
FIG. 13 shows the ideal positions of vehicles, their most recent positions, and their positions in the past circuit, respectively.

Next, another embodiment will be described for judging whether or not revision of the travel plan 80 is necessary. In this example, the plan generating section 14 judges whether or not revision of the travel plan 80 is necessary based on a trend of increase or decrease in the delay amount AD with the elapse of time. This will be described with reference to FIG. 13. In FIG. 13, the shaded areas represent the ideal positions of the vehicles 52, the solid lines represent the most recent positions of the vehicles 52, and the broken lines represent the positions of the vehicles 52 in the previous one circuit.

As described heretofore, if the vehicle 52 is delayed relative to the travel plan 80, each vehicle 52 performs at least either improvement of the average travel velocity VA or reduction of the stop time TS to recover from the delay. As a result of this action, if vehicle delay recovery is possible, revision of the travel plan 80 becomes unnecessary. On the other hand, if vehicle delay recover is not possible, revision of the travel plan 80 becomes necessary.

Here, if the delay amount AD is lowered with the elapse of time, the possibility of vehicle delay recovery is high. Thus, in this example, a trend of increase or decrease in the delay amount AD with the elapse of time is obtained, and based on this trend of increase or decrease, it is judged whether or not revision of the travel plan 80 is necessary. More specifically, the plan generating section 14 stores the delay amount AD calculated by the operation monitoring section 18 into the storage device 20 in association with the obtained timing. Then, the plan generating section 14 calculates a delay amount difference $\Delta AD$ by subtracting the most recent delay amount $AD[n]$ from the past delay amount $AD[n-1]$ only for the prescribed comparison period. Namely, a calculation for $\Delta AD=AD[n-1]-AD[n]$ is performed.

Here, the "comparison period" is not particularly limited provided it is a period during which a trend of recovering from delay can be viewed. However, in general, a reduction in the stop time TS at the station 54 substantially contributes to recovery from delay. For this reason, the "comparison period" may be a period including vehicle stopping and departing events at the station 54 by the vehicle 52. Therefore, the comparison period may be, for example, a period of travel for multiple stations, or may be a period for traveling the travel route 50 for N circuits. In the description hereinafter, a period for traveling the travel route 50 for one circuit is set as the "comparison period", In this case, the delay amount AD corresponding to a differential distance between the most recent vehicle 52 (solid line) and the past vehicle 52 (broken line) in FIG. 13 becomes the delay amount difference $\Delta AD$.

Once the delay amount difference $\Delta AD$ is obtained, the plan generating section 14 compares the delay amount difference $\Delta AD$ with a predetermined differential reference $\Delta AD def$. As a result of the comparison, if the delay amount difference $\Delta AD$ exceeds the differential reference $\Delta AD def$, the delay amount AD decreases with the elapse of time and it can be judged the delay is on a trend to improve.

Therefore, if $\Delta AD>\Delta AD def$, the plan generating section 14 judges that revision of the travel plan 80 is unnecessary.

On the other hand, if the delay amount difference $\Delta AD$ is less than or equal to the differential reference $\Delta AD def$, it can be judged the delay will not sufficiently improve even with the elapse of time or the delay will worsen with the elapse of time. Therefore, if $\Delta AD>\Delta AD def$, the plan generating section 14 judges that revision of the travel plan 80 of some or all of the vehicles 52 is necessary so that the delay can be improved.

For example, in the example of FIG. 13, the delay amount AD of the vehicle 52B is smaller in the most recent circuit (solid line) compared to the past one circuit (broken line), and $\Delta AD$ is large. In this case, the vehicle 52B has a high possibility of vehicle delay recovery so that revision of the travel plan 80 is unnecessary. On the other hand, the delay amount AD of the vehicle 52A is larger in the most recent circuit (solid line) compared to the past one circuit (broken line), and $\Delta AD$ is a negative value. In this case, the vehicle 52A has a low possibility of vehicle delay recovery so that the travel plan 80 is revised. Then, in this manner, the travel plan 80 can be revised with more suitable timing by judging whether or not revision of the travel plan 80 is necessary based on the trend of increase or decrease in the delay amount AD with the elapse of time.

However, the delay amount difference $\Delta AD$ takes a small value not only when the delay continues or increases, but also when no initial delay has occurred. For example, as in the vehicle 52C in FIG. 13, if the delay from the travel plan 80 is small in both the most recent circuit and the past one circuit, the delay amount difference $\Delta AD$ may be less than the differential reference $\Delta AD def$. However, of course, the vehicle 52C in FIG. 13 does not require revision of the travel plan 80. Therefore, even though delay is not occurring, to prevent an erroneous judgment that revision of the travel plan 80 is necessary, calculation of the delay amount difference $\Delta AD$ is executed only when the delay continues beyond a certain amount.

Described more specifically, when the plan generating section 14 obtains the delay amount AD from the operation monitoring section 18, the delay amount AD and the predetermined reference delay amount ADdef are compared. As a result of the comparison, if the delay amount AD is less than the reference delay amount ADdef, the plan generating section 14 judges delay is not occurring and immediately terminates the process. On the other hand, if the delay amount AD is greater than or equal to the reference delay amount ADdef, the plan generating section 14 stores the obtained delay amount AD into the storage device 20 in association with the obtained timing, and then calculates, for example, the delay amount difference $\Delta AD$.

Here, the value of the reference delay amount ADdef, which becomes a criterion for judging delay occurrence, is not particularly limited and should be set according to requirements or past performance of the transportation system 10. For example, correlation between the delay amount AD (for example, delay time TD) and delay recovery probability from past operation data of the transportation system 10 is obtained, and the reference delay amount ADdef may be determined based on the correlation. This is described with reference to FIG. 14.

Figure 14:
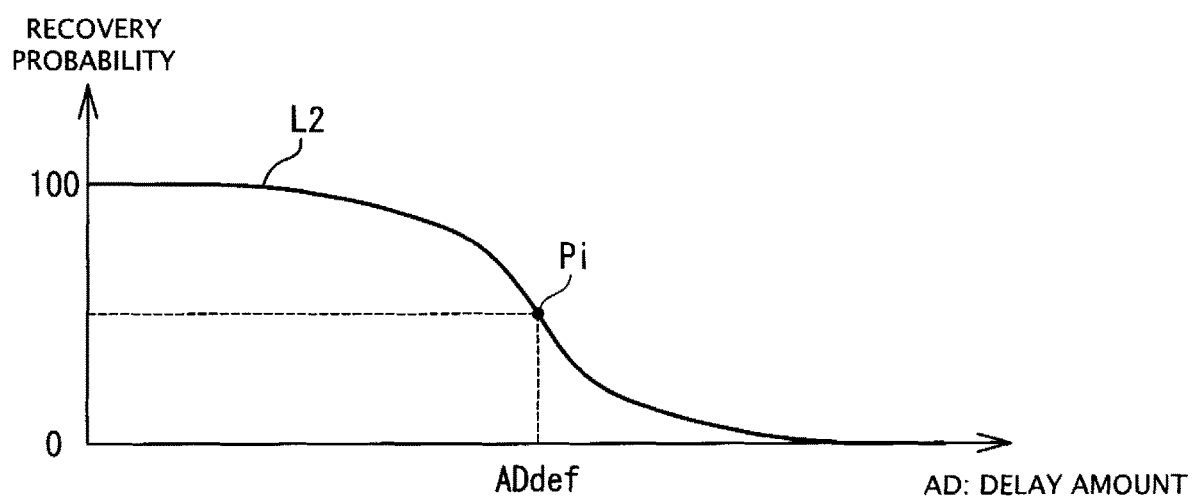
FIG. 14 is a graph showing one example of a delay recovery probability curve.

FIG. 14 is a graph showing one example of a delay recovery probability curve L2, where the horizontal axis represents the delay amount AD and the vertical axis represents the delay recovery probability. The delay recovery probability curve L2 can be created by analyzing past operation data and calculating the probability at which vehicle delay recovery was achieved per delay amount AD. After a delay has occurred, "recovery" of the delay signifies that the delay amount AD could be reduced to within an allowable error within a prescribed allowable time.

The reference delay amount ADdef may be determined based on the delay recovery probability curve L2. For example, the delay amount AD for which the delay recovery probability becomes a predetermined value (for example, "50%") is identified from the delay recovery probability curve L2 and the delay amount AD may be set as the reference delay amount ADdef. In this case, the predetermined value may be a numerical value in a range of 30% to 60%. Furthermore, in another embodiment, as shown in FIG. 14, an inflection point of the delay recovery probability curve L2 is identified and the delay amount AD corresponding to an infection point Pi may be set as the reference delay amount ADdef.

Figure 15:
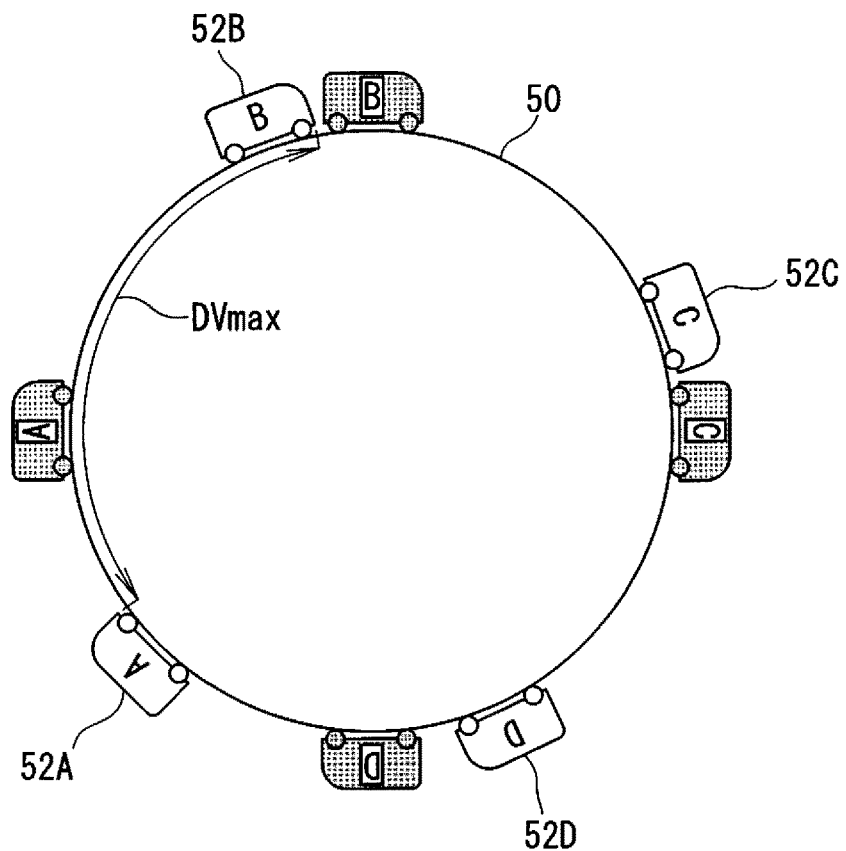
FIG. 15 shows the ideal positions of vehicles and their most recent positions, respectively.

Here, the delay amount AD that is used may be an amount expressing a degree of delay of one vehicle 52 or an amount expressing a degree of delay of the entire plurality of vehicles 52A to 52D. Therefore, the delay amount AD may be the delay time TD or delay distance of one vehicle 52. Furthermore, in another embodiment, the delay amount AD may be an average value or maximum value of the delay distance or the delay time TD of the plurality of vehicles 52A to 52D. Moreover, the delay time AD may be a value obtained from the weighted sum of multiple parameters. For example, the delay amount AD may be a value obtained from the weighted sum of a maximum inter-vehicle time TVmax and an average value TDave of the delay times of the plurality of vehicles 52. Here, the maximum inter-vehicle time TVmax is a time corresponding to the maximum inter-vehicle distance among the plurality of vehicles 52 and is a value obtained by a maximum inter-vehicle distance DVmax divided by the average travel velocity VA or the scheduled velocity Vs of the vehicle 52. In the example of FIG. 15, the time corresponding to the inter-vehicle distance of the vehicle 52A and the vehicle 52B is the maximum inter-vehicle time TVmax. A value obtained by the weighted sum of the maximum inter-vehicle time TVmax and the average value TDave of the delay times at a predetermined ratio may be used as the delay amount AD. Namely, the operation monitoring section 1g may calculate the delay amount AD using expression 2. It should be noted that A in expression 2 is a coefficient greater than 0 and less than 1.

$$AD = A \times TVmax + (1-A) \times TDave \qquad \text{Expression 2}$$

Figure 16:
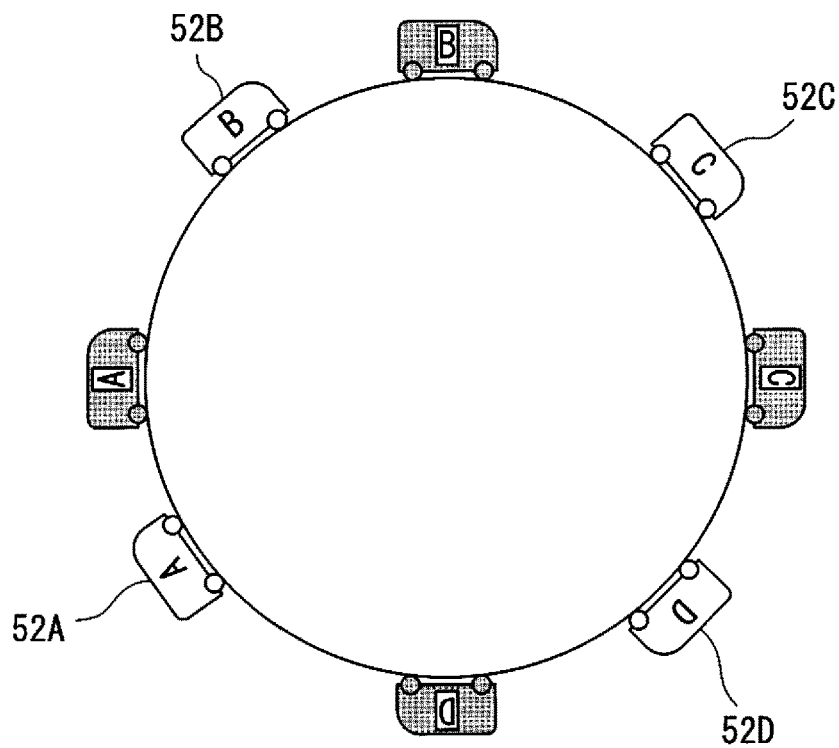
FIG. 16 shows the ideal positions of vehicles and their most recent positions, respectively.

In this manner, by calculating the delay amount AD from the average value TDave of the delay times and the maximum inter-vehicle time TVmax, a delay for which vehicle delay recovery is difficult can be detected more reliably. Namely, as shown in FIG. 16, if all of the vehicles 52A to 52D are substantially delayed, the average value TDave of the delay times becomes large. In this case, there is no problem if the average value TDave is used unchanged as the delay amount AD. On the other hand, as shown in FIG. 15, if only some of the vehicles 52 (vehicle 52A in the example shown) are substantially delayed, the average value TDave is not necessarily larger. Thus, if the average value TDave is used unchanged as the delay amount, it may not be possible to judge that the state of FIG. 15 is a delay occurrence. On the other hand, as described hereinabove, if the value obtained by the weighted sum of the average value TDave and the maximum inter-vehicle time TVmax is used as the delay amount AD, the state of FIG. 15 can be detected as a delay state. As a result, it can be judged whether or not revision of the travel plan 80 is necessary at the required timing.

Figure 17:
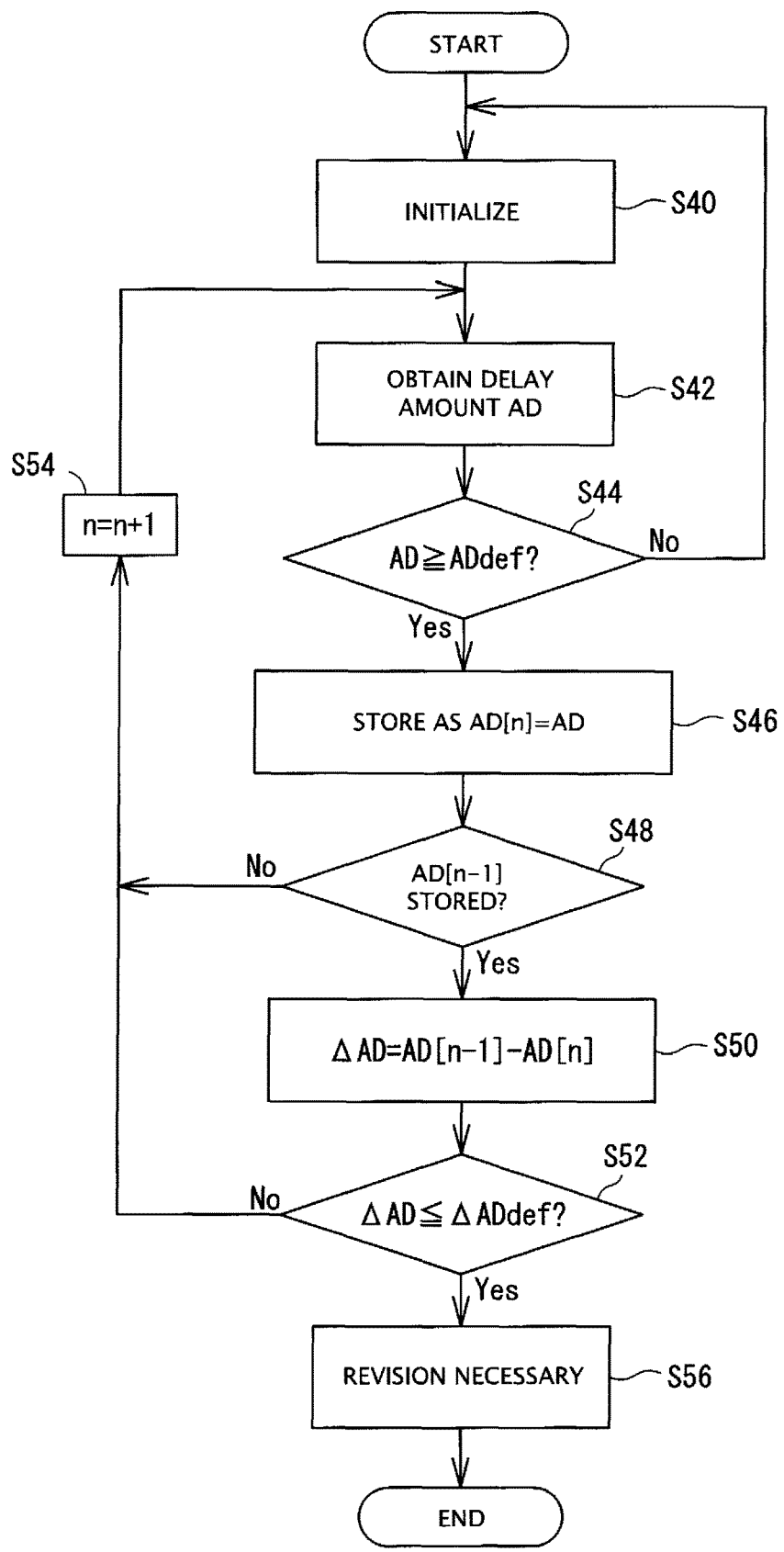
FIG. 17 is a flowchart showing another flow of judging whether revision of the travel plan is necessary.

Next, a judgment on whether or not revision of the travel plan 80 is necessary will be described with reference to FIG. 17. When performing judgment on whether or not revision is necessary, the plan generating section 14 first executes an initialization process (S40). More specifically, the plan generating section 14 sets a parameter n to 1. Furthermore, if the delay amount AD[n] and the delay amount AD[n−1] are stored in the storage device 20, they are deleted.

Next, the plan generating section 14 obtains the delay amount AD from the operation monitoring section 18 (S42). Once the delay amount AD is obtained, the plan generating section 14 compares the predetermined reference delay amount ADdef and the delay amount AD (S44). As a result of the comparison, if AD<ADdef (no at S44), the plan generating section 14 judges that a delay is not occurring and returns to S40. On the other hand, if AD≥ADdef (yes at S44), the plan generating section 14 temporarily stores the current delay amount AD as AD[n] into the storage device 20 (S46).

Next, the plan generating section 14 confirms whether or not the past delay amount, namely, AD[n−1], is stored in the storage device 20 (S48). As a result of the confirmation, if AD[n−1] is not stored (no at S48), it can be judged that a delay had just previously occurred. In this case, the plan generating section 14 increments the parameter n (S54) and returns to step S42.

On the other hand, if AD[n−1] is stored (yes at S48), the plan generating section 14 calculates the delay amount difference ΔAD (S50) by subtracting the most recent delay amount AD[n] from the past delay amount AD[n−1]. Then, the delay amount difference ΔAD and the differential reference ΔADdef are compared (S52). As a result of the comparison, if ΔAD>ΔADdef (no at S52), the delay amount AD is gradually decreasing with the elapse of time, and at this rate it can be judged that the possibility is high for vehicle delay recovery. Therefore, in this case, the plan generating section 14 increments the parameter n (S54) and returns to step S42 without performing revision of the travel plan 80.

On the other hand, if ΔAD≤ΔADdef (yes at S52), the delay amount AD does not substantially change with the elapse of time or the delay amount AD is gradually increasing, and it can be judged that the possibility for vehicle delay recovery is low. Therefore, in this case, the plan generating section 14 judges revision of the travel plan 80 of some or all of the vehicles 52 is necessary (S56) for quick recovery from the delay. Then, as was clearly described heretofore, according to this example, since it is judged whether or not revision of the travel plan 80 is necessary in view of the trend of delay recovery, the travel plan 80 can be revised with more suitable timing.

However, immediately after the travel plan 80 is revised, the delay amount AD of each vehicle 52 relative to the travel plan 80 often increases. In such a case, if the flows in FIG. 9, FIG. 10, and FIG. 17 are applicable, the travel plan 80 may be unnecessarily and frequently revised. Thus, if the travel plan 80 is revised, a judgment may be made where revision of the travel plan 80 is unnecessary for a certain period of time thereafter.

REFERENCE SIGNS LIST

10 TRANSPORTATION SYSTEM
12 OPERATION MANAGEMENT DEVICE
14 PLAN GENERATING SECTION

16 COMMUNICATION DEVICE
18 OPERATION MONITORING SECTION
20 STORAGE DEVICE
22 PROCESSOR
24 I/O DEVICE
10 26 COMMUNICATION INTERFACE
50 TRAVEL ROUTE
52 VEHICLE
54 STATION
56 AUTOMATIC DRIVE UNIT
58 DRIVER UNIT
60 AUTOMATIC DRIVE CONTROLLER
62 ENVIRONMENTAL. SENSOR
64 IN-VEHICLE SENSOR
66 POSITION SENSOR
68 COMMUNICATION DEVICE
70 STATION TERMINAL
72 IN-STATION SENSOR
74 COMMUNICATION DEVICE
80 TRAVEL PLAN
82 POSITION INFORMATION
84 PASSENGER INFORMATION
86 WAITING USER INFORMATION
90 DWELL TIME DISTRIBUTION

The invention claimed is:

1. An operation management device comprising:
a plan generating section for generating a travel plan for each of a plurality of vehicles traveling autonomously along a prescribed travel route on which are disposed a plurality of stations, the travel plan including at least departure timings at the stations;
a communication device for transmitting to corresponding ones of the plurality of vehicles the travel plan generated by the plan generating section; and
an operation monitoring section for obtaining a delay amount of each of the vehicles relative to the travel plan, the delay amount being a delay time of each vehicle relative to the travel plan,
wherein the plan generating section:
calculates, as an allowable dwell time, a maximum dwell time capable of preventing increased delay based on at least the delay time;
compares the allowable dwell time with a dwell time distribution, which is a probability distribution of dwell time at one of the stations;
calculates, as a delay increase probability, a probability of the dwell time being greater than or equal to the allowable dwell time;
judges whether or not revision of the travel plan is necessary based on the delay amount obtained by the operation monitoring section;
judges that revision of the travel plan is necessary if the delay increase probability is greater than or equal to a prescribed reference increase rate; and
revises the travel plan if the revision is judged to be necessary.

2. The operation management device according to claim 1, wherein
the plan generating section revises the dwell time distribution based on at least one of: a time and day, a delay status, a reservation status, passenger information pertaining to passengers transmitted from one of the vehicles, and waiting user information pertaining to waiting users at the one station transmitted from a station terminal disposed at the one station.

3. The operation management device according to claim 2, wherein:
the passenger information and the waiting user information include numbers and attributes of the passengers and the waiting users; and
the attributes include at least one of use or nonuse of a wheelchair, use or nonuse of a white cane, use or nonuse of a baby stroller, use or nonuse of an orthotic device, or an age group.

4. The operation management device according to claim 2, wherein:
the plan generating section calculates an amount of increase of the waiting users per unit time at the one station based on the waiting user information, and
the plan generating station revises the dwell time distribution based on the amount of increase.

5. The operation management device according to claim 1, wherein
the plan generating section judges, based on a change in time of the delay amount, whether or not revision of the travel plan is necessary.

6. The operation management device according to claim 5, wherein
the plan generating section judges that revision of the travel plan is necessary if a delay amount difference, which is a value obtained by subtracting a most recent delay amount from a delay amount from a past predetermined comparison period, is less than or equal to a prescribed differential reference.

7. The operation management device according to claim 6, wherein
the plan generating section does not judge whether or not revision of the travel plan is necessary if the delay amount is less than a prescribed reference delay amount.

8. The operation management device according to claim 1, wherein
the plan generating section judges, after execution of revision of the travel plan, that revision of the travel plan is unnecessary until a certain period has elapsed.

9. An operation management method comprising:
generating a travel plan for each of a plurality of vehicles traveling autonomously along a prescribed travel route on which are disposed a plurality of stations, the travel plan including at least departure timings at the stations;
transmitting to corresponding ones of the plurality of vehicles the generated travel plan;
obtaining a delay amount of each of the vehicles relative to the travel plan, the delay amount being a delay time of each vehicle relative to the travel plan;
calculating, as an allowable dwell time, a maximum dwell time capable of preventing increased delay based on at least the delay time;
comparing the allowable dwell time with a dwell time distribution, which is a probability distribution of dwell time at one of the stations;
calculating, as a delay increase probability, a probability of the dwell time being greater than or equal to the allowable dwell time;
judging whether or not revision of the travel plan is necessary based on the obtained delay amount;
judging that revision of the travel plan is necessary if the delay increase probability is greater than or equal to a prescribed reference increase rate; and
revising the travel plan if the revision is judged to be necessary.

10. A transportation system comprising:
- a plurality of vehicles each traveling autonomously according to a travel plan along a prescribed travel route on which are disposed a plurality of stations; and
- an operation management device for managing operation of the plurality of vehicles, wherein the operation management device comprises:
- a plan generating section for generating, as the travel plan, a plan for each of the plurality of vehicles, the travel plan including at least departure timings at the stations;
- a communication device for transmitting to corresponding ones of the plurality of vehicles the travel plan generated by the plan generating section; and
- an operation monitoring section for obtaining a delay amount of each of the vehicles relative to the travel plan, the delay amount being a delay time of each vehicle relative to the travel plan, wherein the plan generating section:
- calculates, as an allowable dwell time, a maximum dwell time capable of preventing increased delay based on at least the delay time;
- compares the allowable dwell time with a dwell time distribution, which is a probability distribution of dwell time at one of the stations;
- calculates, as a delay increase probability, a probability of the dwell time being greater than or equal to the allowable dwell time;
- judges whether or not revision of the travel plan is necessary based on the delay amount obtained by the operation monitoring section;
- judges that revision of the travel plan is necessary if the delay increase probability is greater than or equal to a prescribed reference increase rate; and
- revises the travel plan if the revision is judged to be necessary.

\* \* \* \* \*